United States Patent [19]
Anderson

[11] Patent Number: 5,845,357
[45] Date of Patent: Dec. 8, 1998

[54] NOZZLE CLEANING DEVICE

[75] Inventor: Christopher T. Anderson, West Carrollton, Ohio

[73] Assignee: Motoman, Inc., West Carrollton, Ohio

[21] Appl. No.: 751,259

[22] Filed: Nov. 18, 1996

[51] Int. Cl.⁶ .............................. B08B 9/02; B23D 79/02
[52] U.S. Cl. ...................... 15/93.1; 15/104.05; 15/104.16
[58] Field of Search ................................ 15/93.1, 104.05, 15/104.16, 104.18

[56] References Cited

U.S. PATENT DOCUMENTS

| | | | |
|---|---|---|---|
| 350,847 | 10/1886 | Sherman | 15/104.18 |
| 481,858 | 8/1892 | Ferris | 15/104.18 |
| 489,606 | 1/1893 | Geneste . | |
| 672,554 | 4/1901 | Henkel | 15/93.1 |
| 2,130,267 | 9/1938 | Cowen | 15/104.18 |
| 2,196,942 | 4/1940 | Roberts . | |
| 2,735,123 | 2/1956 | Mueller | 15/104.18 |
| 2,833,913 | 5/1958 | Bernard . | |
| 3,284,608 | 11/1966 | McDonald . | |
| 3,393,872 | 7/1968 | Rankin . | |
| 3,536,888 | 10/1970 | Borneman . | |
| 3,562,842 | 2/1971 | Turnipseed . | |
| 4,027,349 | 6/1977 | Clavin . | |
| 4,039,393 | 8/1977 | Rankin | 15/104.16 |
| 4,063,059 | 12/1977 | Brolund et al. . | |
| 4,142,086 | 2/1979 | Rotilio . | |
| 4,280,043 | 7/1981 | Feix et al. . | |
| 4,358,861 | 11/1982 | Sard | 15/104.18 |
| 4,417,487 | 11/1983 | Stephens . | |
| 4,426,749 | 1/1984 | Long . | |
| 4,435,873 | 3/1984 | Pool . | |
| 4,469,043 | 9/1984 | Kohler et al. . | |
| 4,583,257 | 4/1986 | Bridges et al. . | |
| 4,702,195 | 10/1987 | Thielmann . | |
| 4,733,050 | 3/1988 | Grafius . | |
| 4,778,976 | 10/1988 | Litt et al. . | |
| 4,834,280 | 5/1989 | Thielmann . | |
| 4,918,286 | 4/1990 | Boyer . | |
| 4,921,046 | 5/1990 | Caskey . | |
| 5,070,568 | 12/1991 | Wilcox et al. . | |
| 5,091,625 | 2/1992 | Kohda et al. . | |
| 5,138,969 | 8/1992 | Thielmann . | |
| 5,221,826 | 6/1993 | Lee et al. . | |
| 5,278,392 | 1/1994 | Takacs . | |

FOREIGN PATENT DOCUMENTS

| | | |
|---|---|---|
| 59-232673 | 12/1984 | Japan . |
| 59-232674 | 12/1984 | Japan . |
| 61-245979 | 11/1986 | Japan . |
| 5-77044 | 3/1993 | Japan . |
| 5-138361 | 6/1993 | Japan . |
| 2157994 | 11/1985 | United Kingdom . |

OTHER PUBLICATIONS

Brochure/literature on ROBO–REAM manufactured by Tregaskiss with description and drawing, 4 pages 2–sided color brochure on the Binzel Cleaning Station, containing description, specs & order info.

6 page color brochure re: Robotic MIG/MAG Torch Cleaning Systems by Alexander Binzel Welding Products.

Literature (9 pages) on the Binzel TCS–5 Reamer Cleaning Station, including features & benefits.

(List continued on next page.)

*Primary Examiner*—Randall E. Chin
*Attorney, Agent, or Firm*—Killworth, Gottman, Hagan & Schaeff, LLP

[57] ABSTRACT

A nozzle cleaning device is provided comprising a support structure capable of releasably receiving a hollow nozzle body having an inner surface and an open end or terminal edge portion, and a scraper apparatus coupled to the support structure and including at least one scraper finger adapted to move into and out of the nozzle body. The scraper finger has a distal end and a camming surface extending from the distal end to a scraping edge. The camming surface engages the nozzle body terminal edge portion as the scraper finger moves into the nozzle body, and the scraping edge engages the nozzle body inner surface as it moves within the nozzle body so as to remove unwanted material from the nozzle inner surface.

19 Claims, 8 Drawing Sheets

OTHER PUBLICATIONS

2–sided color literature information sheet on K & K Pneumatic Nozzle Cleaning Station, Model K–2000, effective Apr. 1, 1990.

Operating Instructions—BRS–LC Torch Cleaning Stations, Edition Jul. 1993, 22 pages.

Brochure/Literature on the Tough Gun by Tregaskiss, with technical data; Jun./1995, 4 pages.

Advertisement page from Welding Design & Fabrication Magazine, entitled "Robotic Torch Cleaning Station", p. 23, dated Dec., '1995.

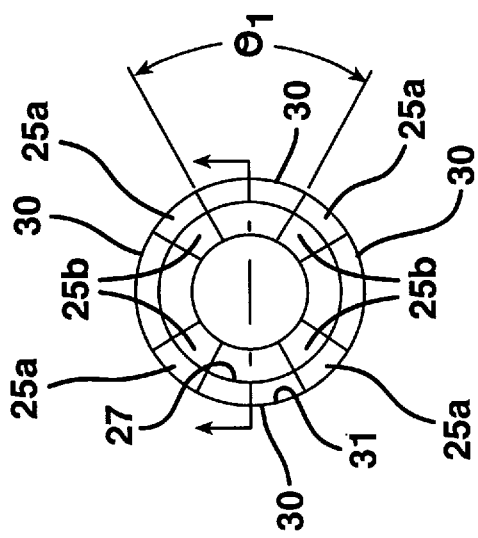
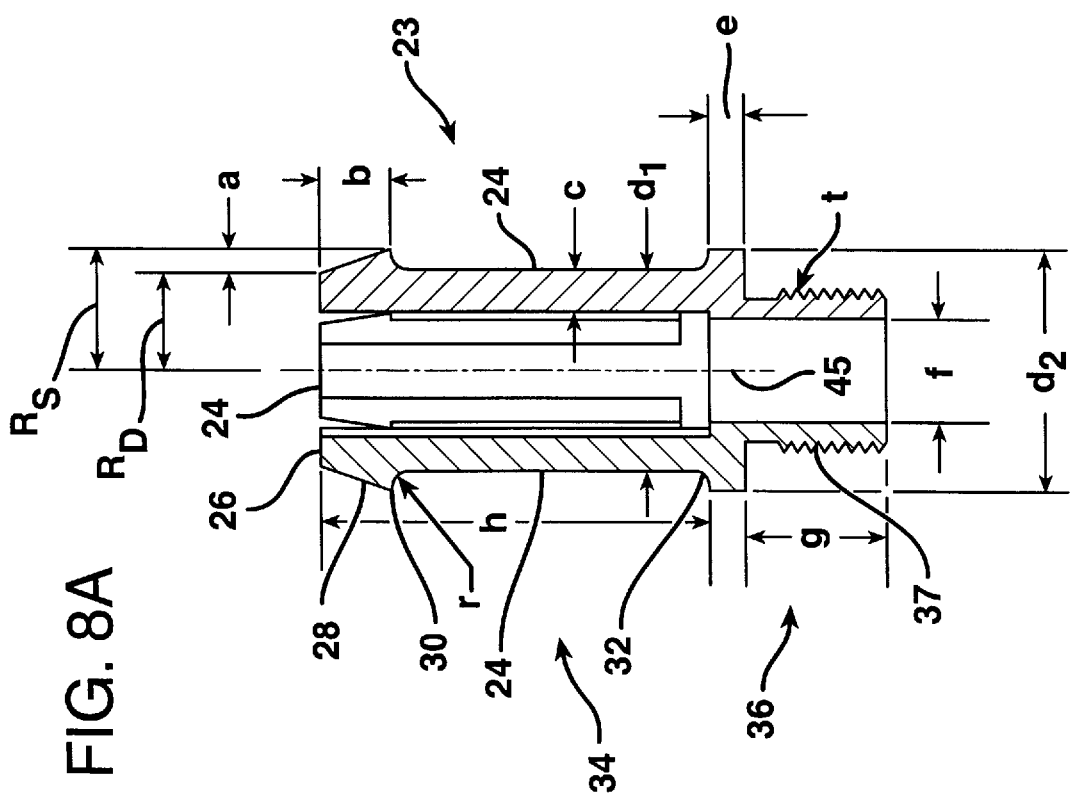

NOZZLE CLEANING DEVICE

BACKGROUND OF THE INVENTION

The present invention relates to a nozzle cleaning device, and, in particular, a device for removing weld spatter from the interior surface of a shielding nozzle used in gas metal arc welding.

In gas metal arc welding operations, also known as metal inert gas (MIG) welding, metal from a consumable electrode is transferred to a workpiece being welded to effect a weld on the workpiece, see U.S. Pat. No. 5,278,392, the disclosure of which is incorporated herein by reference. The consumable electrode is positioned within and extends from a shielding or welding nozzle. Weld spatter, which consists of elements found in the piece being welded and in the consumable electrode, e.g., iron, aluminum, and silicon, is produced during the welding operation and adheres to the interior of the welding nozzle. Accumulated weld spatter causes nozzle degradation, interferes with gas flow within the welding nozzle, causes interruption of welding operations if the spatter bridges the gap between the nozzle and the consumable electrode, and may cause the welding arc to jump from the electrode to the nozzle instead of the workpiece.

Accordingly, there is a need for a low cost nozzle cleaning device capable of removing spatter from the interior of a welding nozzle. Additionally, since nozzle sizes vary from device to device, there is a need for a nozzle cleaner usable with a variety of nozzle sizes.

SUMMARY OF THE INVENTION

This need is met by the present invention wherein nozzle cleaning is effected through the insertion and removal of one or more nozzle scraping fingers which, upon insertion, are forcibly biased against the inner surface of the nozzle body.

In accordance with one aspect of the present invention, a nozzle cleaning device is provided comprising: a support structure capable of releasably receiving a hollow nozzle body, the hollow nozzle body having an inner surface and an open end defined by a terminal edge portion of the nozzle body; and a scraper apparatus coupled to the support structure and including at least one scraper finger adapted to move into and out of the nozzle body. The scraper finger has a distal end and a camming surface extending from the distal end to a scraping edge. The camming surface engages the nozzle body terminal edge portion as the scraper finger moves into the nozzle body, and the scraping edge engages the nozzle body inner surface as it moves within the nozzle body so as to remove unwanted material from the nozzle inner surface.

The scraper apparatus preferably comprises a scraper body having an upper portion and a base portion, the upper portion comprising the at least one scraper finger; and a scraper body advancing mechanism coupled to the support structure and the scraper body and being adapted to move the scraper body relative to the nozzle body. The scraper base portion may comprise a cylindrical threaded portion and the scraper advancing mechanism may comprise a scraper base piston cylinder unit having a complementary threaded portion. The nozzle body may be positioned along a nozzle cleaning axis and the scraper body advancing mechanism may be operative to move the scraping edge back and forth in a direction parallel to the nozzle cleaning axis. Further, the support structure may comprise a nozzle securing mechanism including a nozzle receiver and a nozzle engaging member positioned on opposite sides of the nozzle cleaning axis.

The nozzle receiver preferably comprises a V-shaped wedge having a wedge axis. The nozzle engaging member preferably comprises a reciprocating clamping member having a nozzle contact surface at its distal end. The wedge axis preferably intersects the nozzle cleaning axis. The reciprocating clamping member may be coupled to a clamping member actuator operative to move the clamping member back and forth in a direction substantially parallel to the wedge axis. The clamping member may comprise a threaded rod. The clamping member actuator may comprise a piston/cylinder unit. The threaded rod may be coupled to a complementary threaded portion of a piston forming part of the piston/cylinder unit such that the location of the clamping member contact surface relative to the piston may be adjusted by rotating the threaded rod relative to the piston.

In accordance with another aspect of the present invention, a nozzle scraper body is provided comprising: a scraper base portion and at least one scraper finger extending from the scraper base portion and having a distal end and at least one camming surface extending from the distal end to a scraping edge.

The scraping edge preferably substantially follows a contour of an arc of a scraping edge circle. Similarly, the distal end of the at least one scraper finger preferably follows a contour of an arc of a distal end circle and the camming surface is inclined such that a diameter of the scraping edge circle is greater than a diameter of the distal end circle. The scraper base portion may comprise a cylindrical threaded portion. The at least one scraper finger preferably comprises a flexible and resilient material.

The at least one scraper finger preferably comprises a plurality of scraper fingers, wherein the at least one camming surface comprises a plurality of camming surfaces, and wherein each of the camming surfaces extend to respective scraping edges. Further, the plurality of scraper fingers may define a major portion of a scraper finger cylinder wherein a minor portion of the scraper finger cylinder comprises gaps between the plurality of scraper fingers. The gaps between the plurality of scraper fingers preferably define equiangularly spaced arc-shaped gaps within a cross section of the scraper finger cylinder. Similarly, the respective scraping edges may define a major portion of a scraping edge circle wherein a minor portion of the scraping edge circle comprises gaps between the respective scraping edges. The gaps between respective scraping edges may define equiangularly spaced arc-shaped gaps within the scraping edge circle.

In accordance with yet another aspect of the present invention, a method of cleaning a nozzle body is provided comprising the steps of: securing a nozzle body in a nozzle cleaning position along a nozzle cleaning axis, the nozzle body having an inner surface, an open end defined by a terminal edge portion of the nozzle body, and a nozzle interior, the nozzle interior being partially bounded by the nozzle body inner surface; advancing at least a portion of a nozzle scraper body having a scraping edge through the nozzle body open end into the nozzle interior in a first direction; and scraping the nozzle body inner surface with the scraping edge by retracting the portion of the nozzle scraper body from the nozzle interior in a second direction generally opposite the first direction.

The step of securing the nozzle body may comprise positioning the nozzle body in the nozzle cleaning position and advancing a nozzle engaging member along a portion of a linear path extending from the nozzle engaging member to a nozzle receiver, wherein the linear path is intersected by the nozzle. The step of advancing the nozzle scraper body portion may comprise causing at least one camming surface of the nozzle scraper body portion to contact the nozzle terminal edge portion. As the nozzle scraper body portion is advanced into the nozzle interior, the camming surface preferably slides against the nozzle terminal edge portion and the nozzle scraper body portion flexes towards the nozzle cleaning axis.

The step of retracting the portion of the nozzle scraper body preferably comprises causing the scraping edge of the nozzle scraper body portion to contact and move along the nozzle body inner surface as the scraping edge is forcibly biased towards the nozzle body inner surface. Further, the nozzle body portion may be rotated through a predetermined angle following the scraping step and the advancing and scraping steps may be subsequently repeated.

In accordance with yet another aspect of the present invention, a scraper apparatus adapted to be supported on a support structure is provided comprising a scraper body advancing mechanism adapted to be supported on the support structure and a scraper body mounted to the scraper body advancing mechanism. The scraper body has an upper portion and a base portion. The upper portion comprises at least one scraper finger. The scraper finger has a distal end and a camming surface extending from the distal end to a scraping edge.

Accordingly, it is an object of the present invention to enable low cost removal of spatter from the interior of a variety of welding nozzles.

BRIEF DESCRIPTION OF THE DRAWINGS

FIG. 8A is a cross sectional view of a scraper body of a scraper apparatus according to the present invention; and FIG. 8B is a top view of an upper portion of a scraper body of a scraper apparatus according to the present invention.

DETAILED DESCRIPTION OF THE INVENTION

Figure 1:
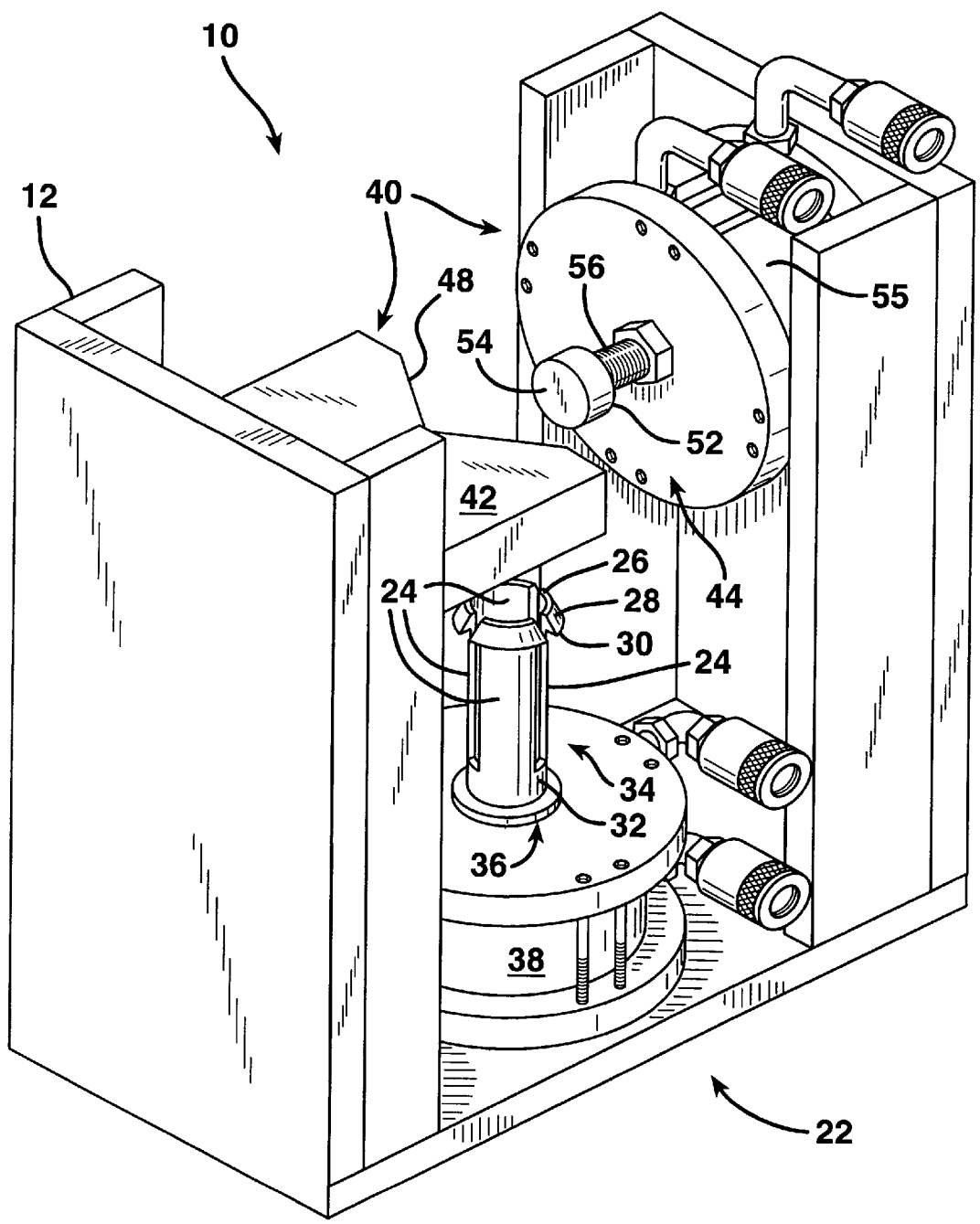
FIG. 1 is a perspective view of a nozzle cleaning device according to the present invention.

Referring to FIGS. 1–8B, a nozzle cleaning device 10 constructed in accordance with the present invention is shown comprising a support structure 12 capable of releasably receiving a hollow nozzle body 14. The hollow nozzle body 14 has an inner surface 16, a nozzle interior 17 partially bounded by the nozzle body inner surface 16, and an open end 18 defined by a terminal edge portion 20 of the nozzle body 14, see FIG. 4. A scraper apparatus 22 is coupled to the support structure 12 and includes, in the illustrated embodiment, four scraper fingers 24 formed of a flexible and resilient material, e.g., carbon steel, stainless steel, aluminum, copper, or a polymer. The scraper fingers 24 are designed such that they can be inserted into and removed from the nozzle interior 17. Each scraper finger 24 has a distal end 26 and a camming surface 28 extending from the distal end 26 to a scraping edge 30.

The scraper apparatus 22 includes a scraper body 32 and a scraper body advancing mechanism 38. The scraper body 32 has an upper portion 34 and a base portion 36. The upper portion 34 includes the scraper fingers 24. The base portion 36 comprises a cylindrical threaded portion 37, see FIG. 8A.

Figure 3:
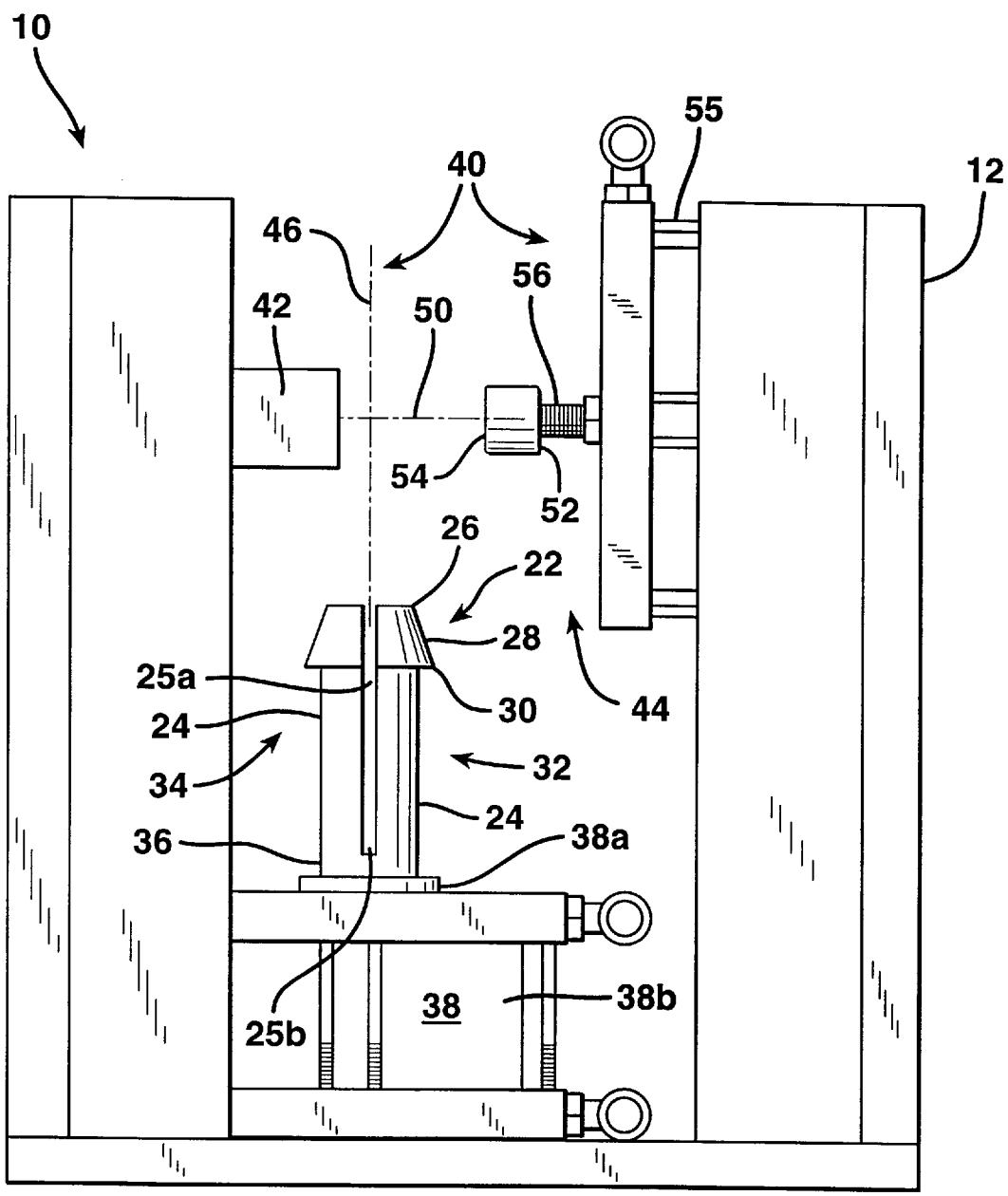
Figure 4:
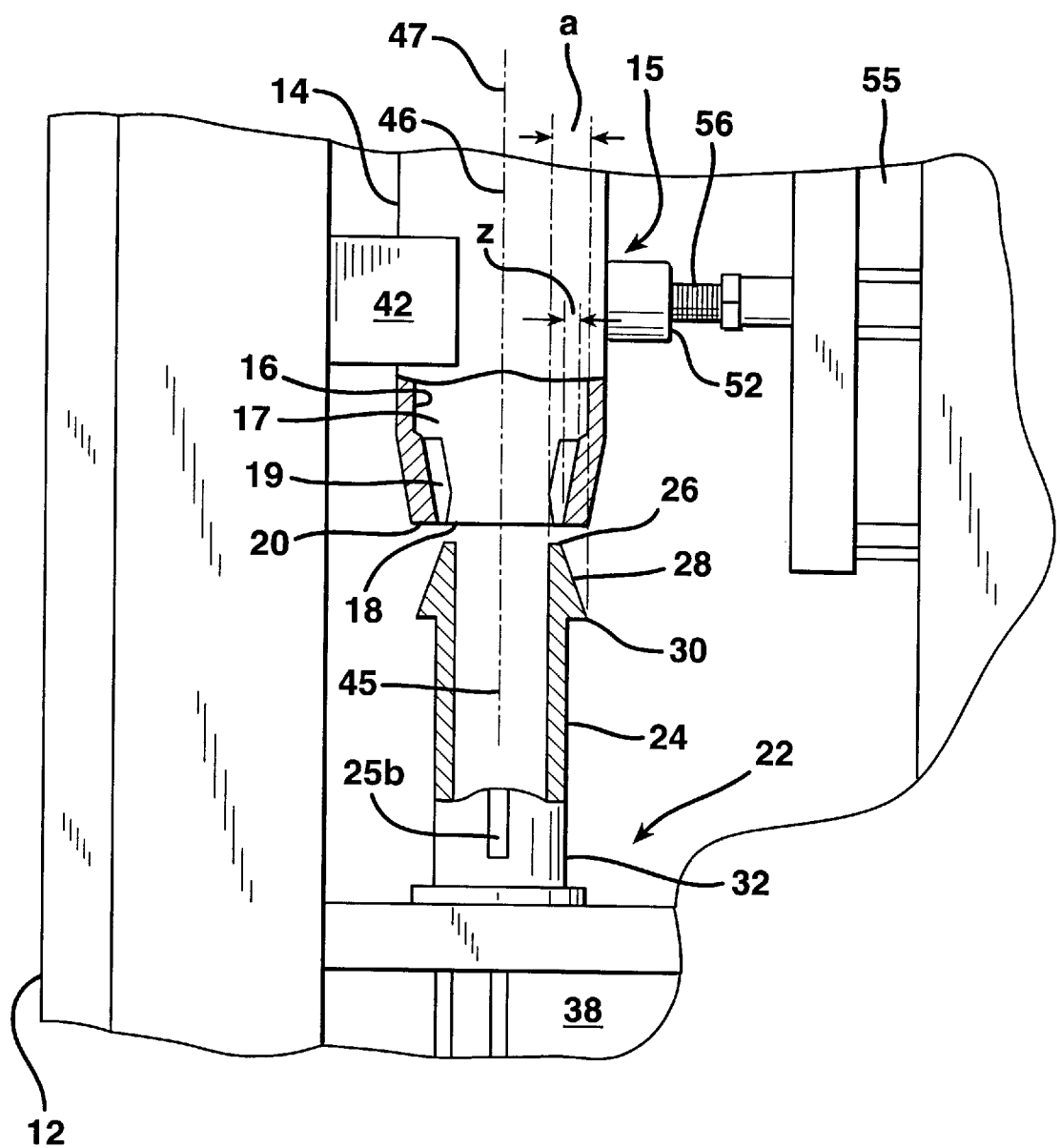
FIGS. 4–7 are front views, broken away and partially in cross section, of a nozzle cleaning device illustrating, in successive steps, the nozzle cleaning operation according to the present invention.

The scraper body advancing mechanism 38 includes a piston 38a of a piston/cylinder unit 38b having a complementary threaded portion sized so as to removably receive the cylindrical threaded portion 37, see FIG. 3. As will be appreciated by those skilled in the art, the scraper body 32 may be removably secured to the scraper advancing mechanism 38 by a non-threaded arrangement, as long as the non-threaded arrangement allows for convenient removal of the scraper body 32 from the advancing mechanism 38.

The scraper body advancing mechanism 38 is fixedly coupled to the support structure 12 via conventional fasteners such as bolts (not shown) and to the scraper body 32 via the engagement of the threaded portion 37 with the piston 38a and moves the scraper body 32 relative to the nozzle body 14 in a direction substantially parallel to the nozzle body 14. Specifically, the nozzle body 14 is positioned along a nozzle cleaning axis 46 and the scraper body advancing mechanism 38 is operative to move the scraper body 32, and consequently the scraping edges 30 on the scraper fingers 24, back and forth in a direction parallel to the nozzle cleaning axis 46. As noted above, the advancing mechanism 38 comprises the pneumatic piston/cylinder unit 38b; however, as will be appreciated by those skilled in the art, a variety of other types of advancing mechanisms not specifically discussed herein may be utilized to move the scraper body 32.

Figure 2:
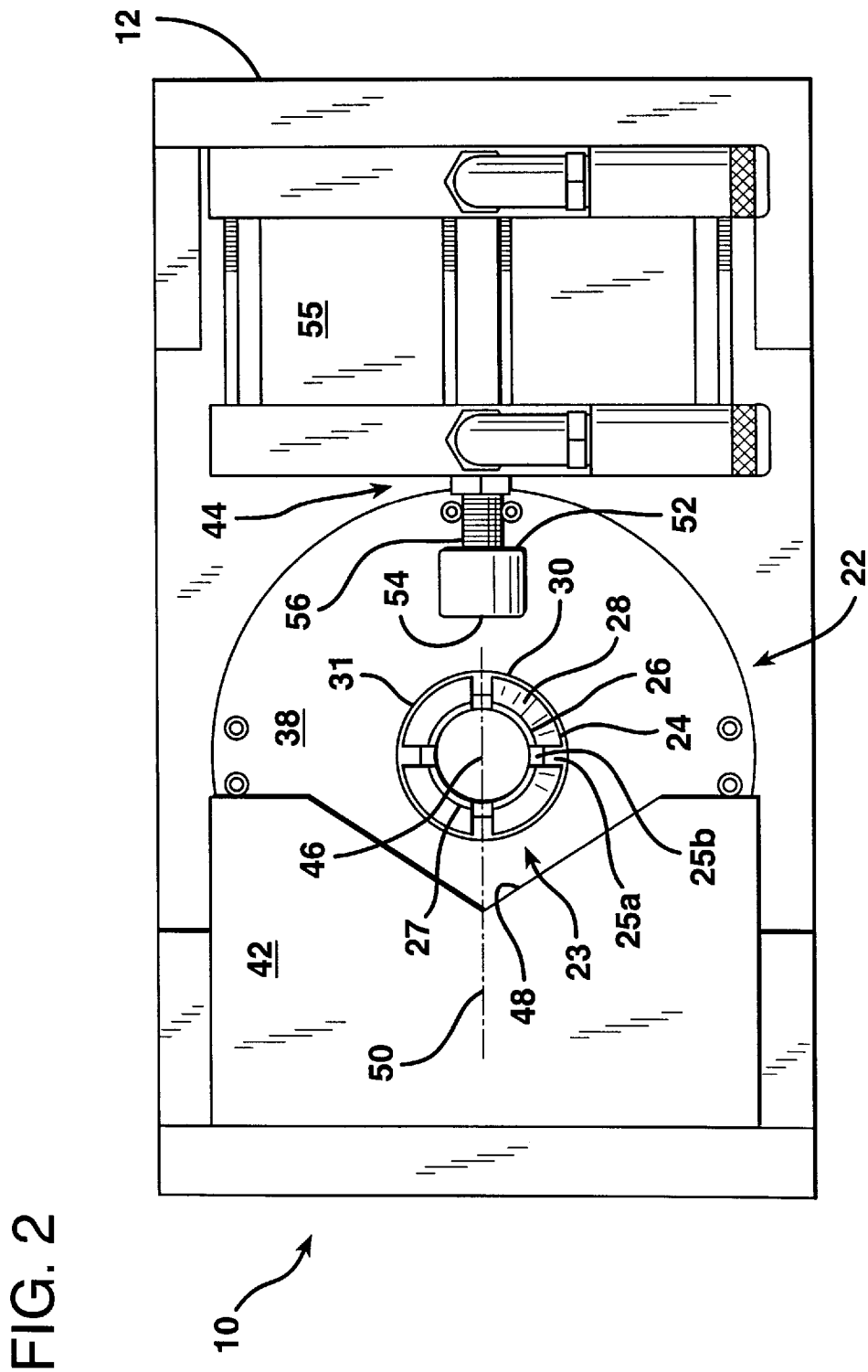
FIGS. 2 and 3 are top and front plan views, respectively, of the nozzle cleaning device of FIG. 1.

The support structure 12 comprises a nozzle securing mechanism 40 including a nozzle receiver 42 and a nozzle engaging member 44 positioned on opposite sides of the nozzle cleaning axis 46, see FIGS. 1–3. Specifically, the nozzle receiver 42 comprises a V-shaped wedge 48 having a wedge axis 50. The nozzle engaging member 44 comprises a reciprocating clamping member 52 having a nozzle contact surface 54 at its distal end. The wedge axis 50 intersects the nozzle cleaning axis 46. The reciprocating clamping member 52 is coupled to a clamping member actuator 55 which is operative to move the clamping member 52 back and forth in a direction substantially parallel to the wedge axis 50. Specifically, the clamping member 52 comprises a threaded rod 56 coupled to a complementary threaded portion of a piston 55a forming part of a piston/cylinder unit 55b, which unit 55b comprises the clamping member actuator 55, see FIG. 6. The location of the clamping member contact surface 54 relative to the piston 55a may be adjusted by rotating the threaded rod 56 in the threaded portion of the piston 55a.

The nozzle scraper body 32 is shown in detail in FIGS. 8A and 8B. Each scraping edge 30 substantially follows a contour of an arc of a scraping edge circle 31. Similarly, each distal end 26 follows a contour of an arc of a distal end circle 27. The camming surface 28 is inclined such that a diameter of the scraping edge circle 31 is greater than a diameter of the distal end circle 27. The respective scraping edges 30 define a major portion of the scraping edge circle 31 and a minor portion of the scraping edge circle 31 comprises a first set of gaps 25a between the respective scraping edges 30. The scraper fingers 24 are arranged about a common longuitudinal scraper body axis 45 and define a major portion of a scraper finger cylinder 23 and a minor portion of the scraper finger cylinder 23 comprises a second set of gaps 25b between the scraper fingers 24. The first set of gaps 25a and the second set of gaps 25b are illustrated in FIGS. 2 and 8B. The second set of gaps 25b between the scraper fingers 24 define equiangularly spaced arc-shaped gaps within a cross section of the scraper finger cylinder 23. Similarly, the first set of gaps 25a between respective scraping edges 30 define equiangularly spaced arc-shaped gaps within the scraping edge circle 31.

Approximate nozzle scraper body dimensions for a steel nozzle scraper body according to one embodiment of the present invention are illustrated in FIGS. 8A and 8B where a=0.06251" (0.16 cm), b=0.200" (0.508 cm), c=0.062" (0.158 cm), $d_1$=0.525" (1.33 cm), $d_2$=0.690" (1.75 cm), e=0.130" (0.330 cm), f =0.3125" (0.79 cm), g=0.5" (1.27 cm), h=1.25" (3.18 cm), r=0.0301" (0.080 cm), and t comprises a ½" (1.27 cm) by 20 thread.

In operation, the upper portion 34 of the scraper body 32 is moved into the nozzle body 14 by the advancing mechanism 38. As the scraper fingers 24 move into the nozzle body 14, the camming surfaces 28 engage the nozzle body terminal edge portion 20 causing the fingers 24 to flex inwardly. After the camming surfaces 28 clear the edge portion 20, the fingers 24 flex outwardly to permit the scraping edges 30 to engage the nozzle body inner surface 16. After the fingers 24 have been moved a sufficient distance into the nozzle body 14 to permit the scraping edges 30 to be positioned above all or a substantial portion of the weld spatter 19, the upper portion 34 is then withdrawn from the scraper body 32 via the advancing mechanism 38. As the fingers 24 move downwardly, the scraping edges 30 engage the nozzle body inner surface 16 so as to remove unwanted material or weld spatter 19 from the inner surface 16. Additionally, some unwanted material or weld spatter 19 may be removed as the scraper fingers 24 move upwardly.

As will be appreciated by those skilled in the art, the depth to which the upper portion 34 of the scraper body 32 is inserted into the nozzle interior 17 may be varied according to the design of the nozzle and the degree and nature of spatter 19 accumulated on the nozzle body inner surface 16. Further, the scraper body 32 may be inserted into a specific nozzle a plurality of successive times to achieve nozzle cleaning. Finally, the nozzle body 14 may be rotated through a predetermined angle, e.g., 45°, between insertions of the scraper body 32 into a particular nozzle body 14 to improve the uniformity of cleaning;

Referring specifically to FIGS. 4–7, a method of cleaning a nozzle body according to the present invention is illustrated. The nozzle body 14 is secured in a nozzle cleaning position 15 along the nozzle cleaning axis 46 by positioning the nozzle body 14 between the nozzle receiver 42 and the nozzle engaging member 44. The nozzle engaging member 44 is advanced toward the nozzle receiver 42 until the nozzle body 14 is frictionally clamped between the nozzle receiver 42 and the nozzle engaging member 44. As is clearly illustrated in FIG. 4, the nozzle cleaning axis 46 is collinear with a longitudinal nozzle body axis 47.

Figure 5:
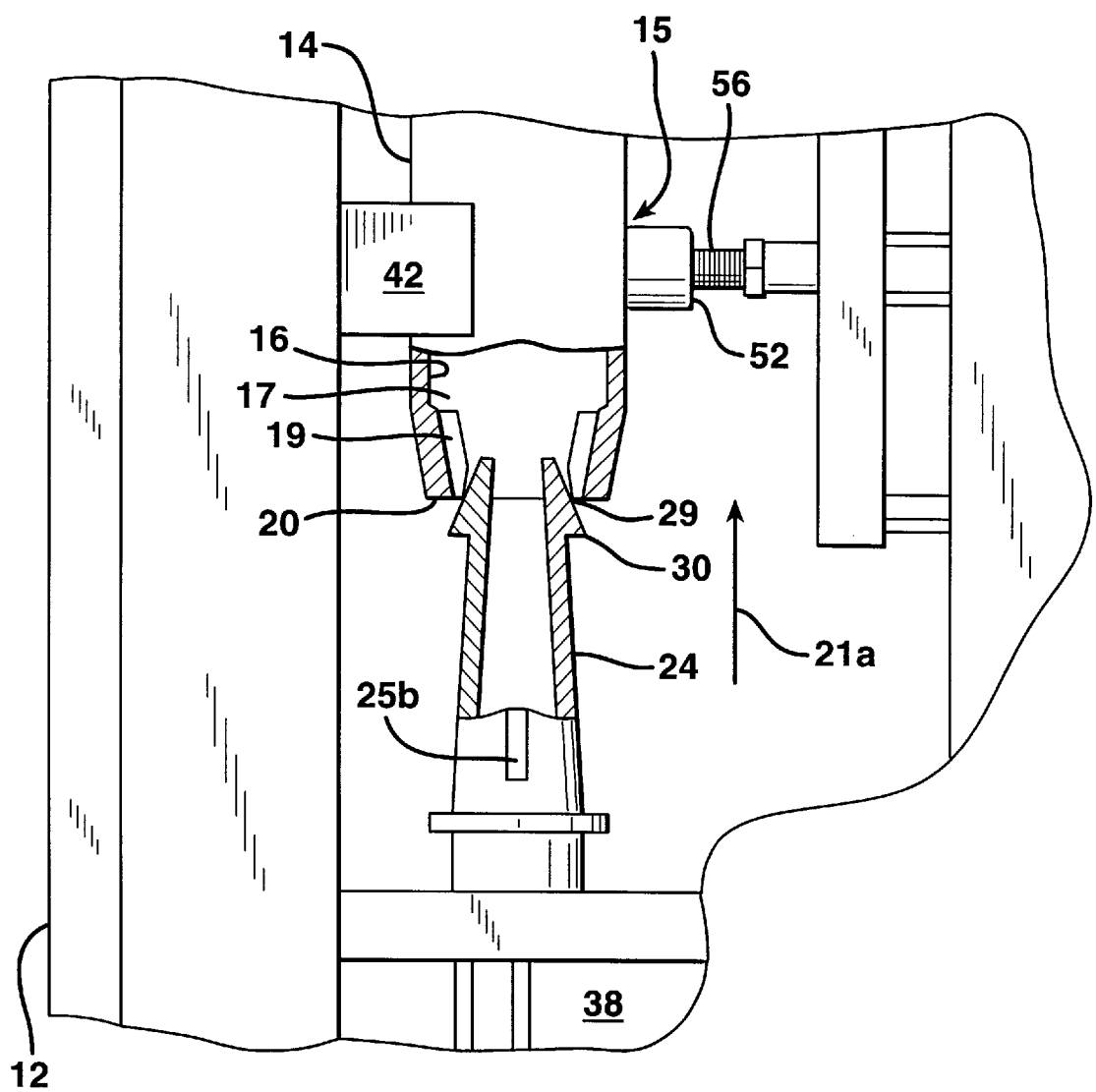
Figure 6:
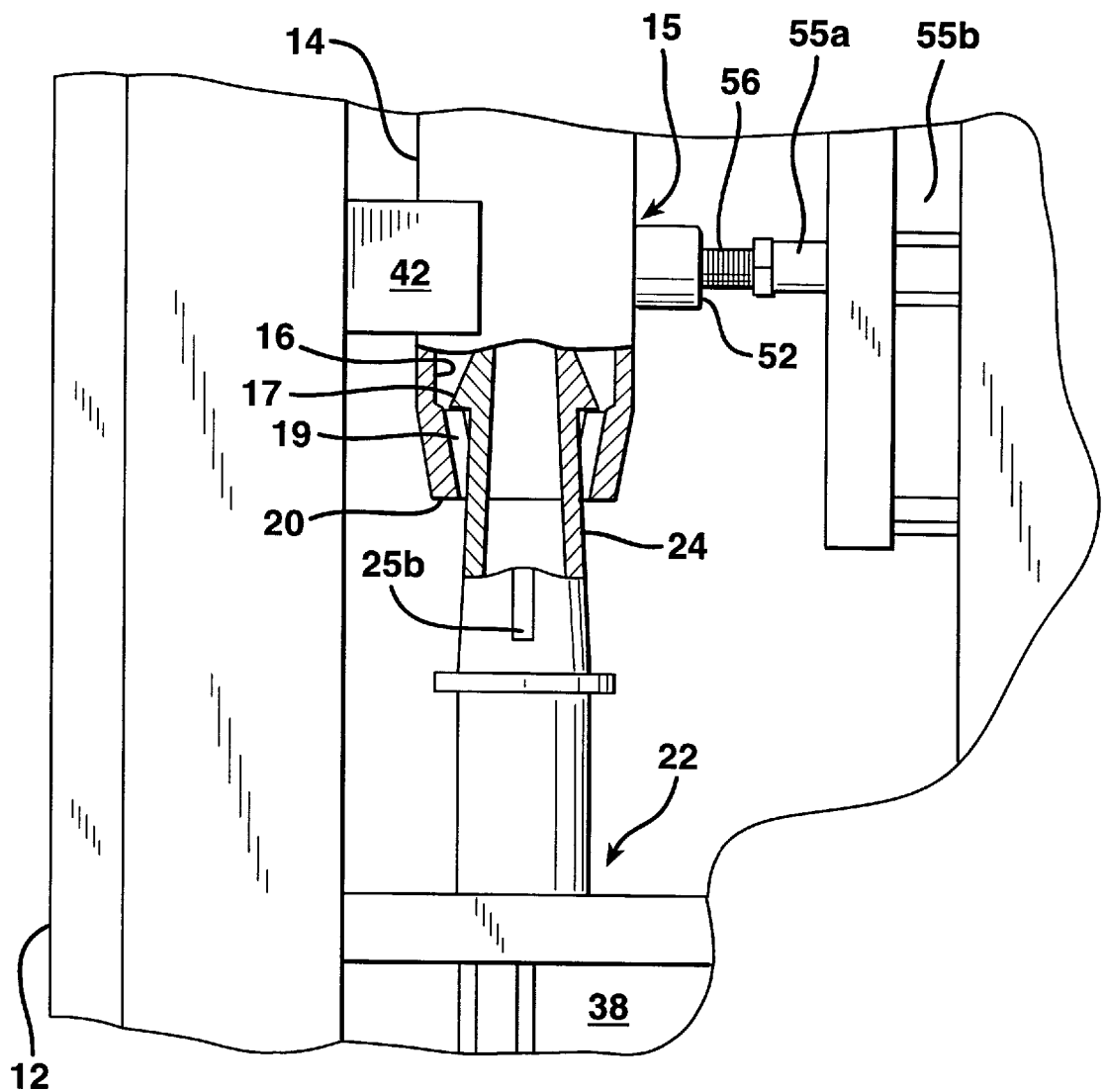
Figure 7:
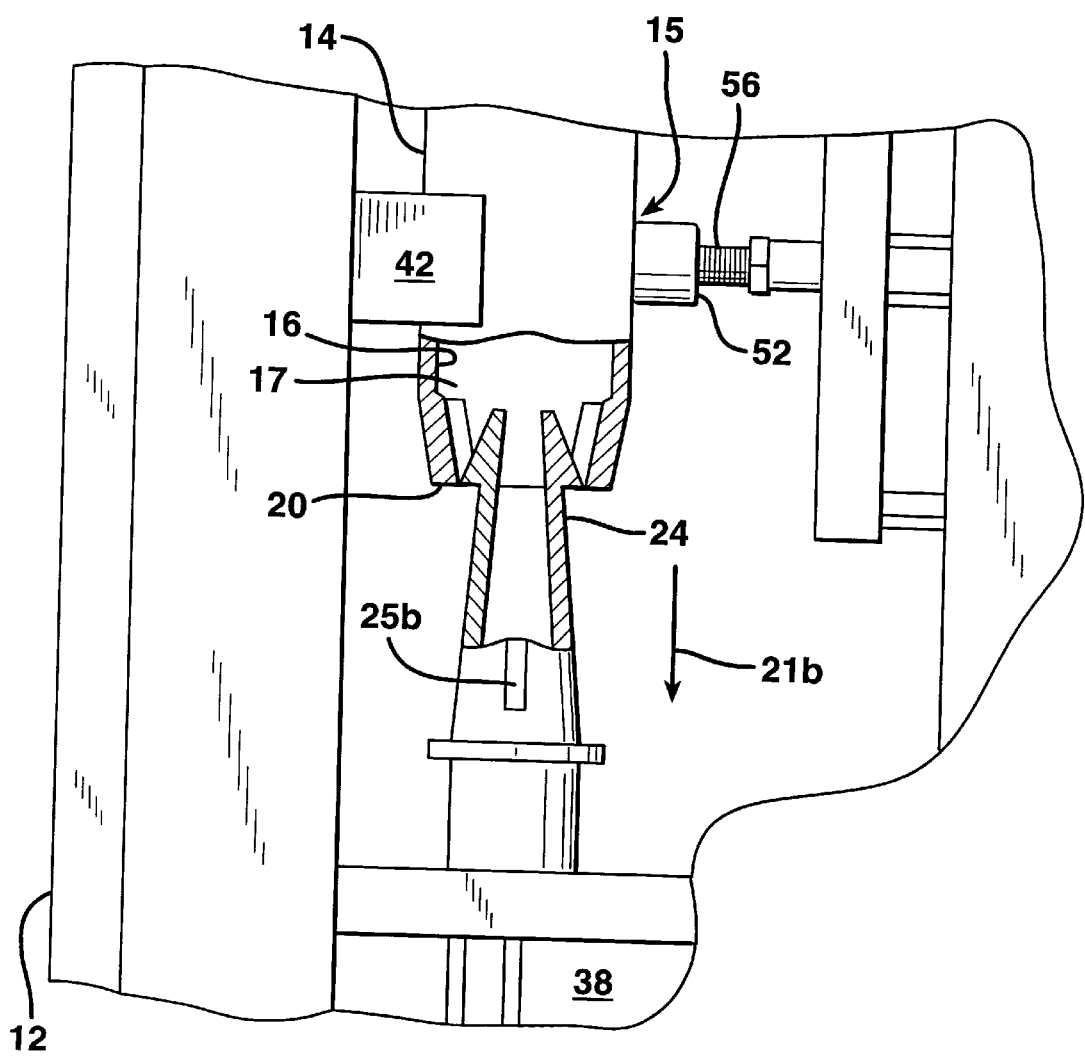

The scraper fingers 24 are advanced through the nozzle body open end 18 into the nozzle interior 17 in a first direction 21a, see FIG. 5. The nozzle body inner surface 16 is scraped with the scraping edges 30 by retracting the fingers 24 from the nozzle interior 17 in a second direction 21b opposite the first direction 21a, see FIGS. 6 and 7. As the scraping edges 30 are advanced through the nozzle body open end 18 into the nozzle interior 17, each camming surface 28 is arranged to contact or engage the nozzle terminal edge portion 20 and slides against the nozzle terminal edge portion 20, along an engagement path 29 on the camming surface 28 causing each scraper finger 24 to flex toward the nozzle cleaning axis 46, see FIGS. 4 and 5. As is clearly illustrated in FIG.5, the engagement path 29 terminates at the scraping edge 30. Consequently, as the scraping edges 30 are retracted from the nozzle interior 17, the scraping edges 30 contact and move along the nozzle body inner surface 16 while being forcibly biased outwardly toward the nozzle body inner surface 16. This forcibly biased scraping action effectively removes weld spatter 19 from the nozzle body inner surface 16.

Stated differently, as is clearly illustrated in FIGS. 4–7, and with reference to the description of FIG. 8 above, each of the plurality of scraper fingers 24 include the distal end 26, the camming surface 28, and the scraping edge 30. Each of the distal ends 26 is positioned along a substantially circular path offset from the longitudinal scraper body axis 45 by a distal end radius $R_D$. Each of the scraping edges 30 is positioned along a substantially circular path offset from said longitudinal scraper body axis 45 by a scraping edge radius $R_S$ greater than the distal end radius $R_D$. The respective camming surfaces 28 extend from the respective distal end 26 to the respective scraping edges 30 along the engagement path 29, which is inclined with respect to the longitudinal scraper body axis 45. Each camming surface 28 defines a radial camming dimension a extending from said distal end radius $R_D$ to said scraping edge radius $R_S$. The nozzle scraper body 32 is arranged to permit the scraper fingers 24 to flex in the direction of said longitudinal scraper body axis 45 at least as far as said radial camming dimension a and the scraper fingers are flexible in the direction of said longitudinal nozzle body axis 45 so as to be forcibly biased away from said longitudinal scraper body axis 45, as is noted above. The biasing force is great enough to enable said scraping edges 30 to remove weld spatter 19 from the nozzle body inner surface 16, as is also noted above. As is clearly illustrated in FIG. 4 and 5, the inner surface 16 of the hollow nozzle body 14 converges toward the longitudinal nozzle body axis 47 to define a radial converging dimension z. The radial camming dimension a is at least as large as the radial converging dimension z.

Having described the invention in detail and by reference to preferred embodiments thereof, it will be apparent that modifications and variations are possible without departing from the scope of the invention defined in the appended claims.

What is claimed is:

1. A nozzle cleaning device comprising:

a support structure capable of releasably receiving a hollow nozzle body defining a longitudinal nozzle body axis, said hollow nozzle body having an inner surface and an open end defined by a terminal edge portion of said nozzle body; and a scraper apparatus coupled to said support structure and including at least one scraper finger adapted to move into and out of said nozzle body along said longitudinal nozzle body axis and flex in the direction of said nozzle body axis, said at least one scraper finger having a distal end, a camming surface, and a scraping edge, wherein said camming surface extends from said distal end to said scraping edge, said camming surface is arranged to engage said nozzle body terminal edge portion along an engagement path on said camming surface as said at least one scraper finger moves into said nozzle body along said longitudinal nozzle body axis, said engagement path terminates at said scraping edge, and wherein said scraping edge is positioned to engage said nozzle body inner surface as said scraper apparatus moves within said nozzle body along said longitudinal nozzle body axis so as to remove unwanted material from said nozzle body inner surface.

2. A device as claimed in claim 1 wherein said scraper apparatus comprises:

a scraper body having an upper portion and a base portion, said upper portion comprising said at least one scraper finger; and a scraper body advancing mechanism coupled to said support structure and said scraper body and being adapted to move said scraper body relative to said nozzle body.

3. A device as claimed in claim 2 wherein said scraper base portion comprises a cylindrical threaded portion and said scraper advancing mechanism comprises a scraper base piston/cylinder unit having a complementary threaded portion.

4. A device as claimed in claim 2 wherein said nozzle body is positioned along a nozzle cleaning axis and said scraper body advancing mechanism is operative to move said scraping edge back and forth in a direction parallel to said nozzle cleaning axis.

5. As nozzle cleaning device as claimed in claim 1 wherein:

said inner surface of said hollow nozzle body converges toward said longitudinal nozzle body axis to define a radial converging dimension;

said camming surface extends from said distal end to said scraping edge along an engagement path inclined with respect to said longitudinal scraper body axis and defines a radial camming dimension extending from said distal end radius to said scraping edge radius; and wherein said radial camming dimension is at least as large as said radial converging dimension.

6. A nozzle cleaning device comprising:

a support structure capable of releasably receiving a hollow nozzle body, said hollow nozzle body having an inner surface and an open end defined by a terminal edge portion of said nozzle body; and a scraper apparatus coupled to said support structure and including at least one scraper finger adapted to move into and out of said nozzle body, said scraper finger having a distal end and a camming surface extending from said distal end to a scraping edge, said camming surface engaging said nozzle body terminal edge portion as said scraper finger moves into said nozzle body, and said scraping edge engaging said nozzle body inner surface as it moves within said nozzle body so as to remove unwanted material from said nozzle inner surface, wherein said nozzle body is positioned along a nozzle cleaning axis and said support structure comprises a nozzle securing mechanism including a nozzle receiver and a nozzle engaging member positioned on opposite sides of said nozzle cleaning axis.

7. A device as claimed in claim 6 wherein said nozzle receiver comprises a V-shaped wedge having a wedge axis, said nozzle engaging member comprises a reciprocating clamping member having a nozzle contact surface at its distal end, and said wedge axis intersects said nozzle cleaning axis.

8. A device as claimed in claim 7 wherein said reciprocating clamping member is coupled to a clamping member actuator operative to move said clamping member back and forth in a direction substantially parallel to said wedge axis.

9. A device as claimed in claim 7 further comprising a piston/cylinder unit including a piston forming part having a complementary threaded portion, wherein said clamping member comprises a threaded rod coupled to said complementary threaded portion of said piston forming part of said piston/cylinder unit such that the location of the clamping member contact surface relative to the piston may be adjusted by rotating said threaded rod relative to said piston.

10. A scraper apparatus adapted to be supported on a support structure comprising:

a scraper body advancing mechanism adapted to be supported on a support structure;

a scraper body mounted to said scraper body advancing mechanism, said scraper body having a scraper base portion and a plurality of scraper fingers extending from said scraper base portion and arranged about a common longitudinal scraper body axis, wherein each of said plurality of scraper fingers includes a distal end, a camming surface, and a scraping edge, each of said distal ends is positioned along a path offset from said longitudinal scraper body axis by a distal end radius, each of said scraping edges is positioned along a path offset from said longitudinal scraper body axis by a scraping edge radius greater than said distal end radius, said camming surface extends from said distal end to said scraping edge along an engagement path inclined with respect to said longitudinal scraper body axis and defines a radial camming dimension extending from said distal end radius to said scraping edge radius, said nozzle scraper body is arranged to permit said plurality of scraper fingers to flex in the direction of said longitudinal scraper body axis at least as far as said radial camming dimension, said plurality of scraper fingers are flexible in the direction of said longitudinal nozzle body axis so as to be forcibly biased away from said longitudinal scraper body axis, and wherein said biasing force is great enough to enable said scraping edges to remove weld splatter from a nozzle body surface.

11. A nozzle scraper body comprising:

a scraper base portion; and a plurality of scraper fingers extending from said scraper base portion and arranged about a common longitudinal scraper body axis, wherein each of said plurality of scraper fingers include a distal end, a camming surface, and a scraping edge, said distal end is positioned along a path offset from said longitudinal scraper body axis by a distal end radius, said scraping edge is positioned along a path offset from said longitudinal scraper body axis by a scraping edge radius greater than said distal end radius, said camming surface extends from said distal end to said scraping edge along an engagement path inclined with respect to said longitudinal scraper body axis and defines a radial camming dimension extending from said distal end radius to said scraping edge radius, said nozzle scraper body is arranged to permit said plurality of scraper fingers to flex in the direction of said longitudinal scraper body axis at least as far as said radial camming dimension, said plurality of scraper fingers are flexible in the direction of said longitudinal nozzle body axis so as to be forcibly biased away from said longitudinal scraper body axis, and wherein said biasing force is great enough to enable said scraping edges to remove weld splatter from a nozzle body surface.

12. A nozzle scraper body as claimed in claim 11 wherein said scraping edge substantially follows a contour of an arc of a scraping edge circle.

13. A nozzle scraper body as claimed in claim 12 wherein respective distal ends of said plurality of scraper fingers follow a contour of an arc of a distal end circle.

14. A nozzle scraper body as claimed in claim 11 wherein said scraper base portion comprises a cylindrical threaded portion.

15. A nozzle scraper body as claimed in claim 11 wherein said plurality of scraper fingers define a major portion of a scraper finger cylinder and wherein a minor portion of said scraper finger cylinder comprises respective gaps between said plurality of scraper fingers.

16. A nozzle scraper body as claimed in claim 15 wherein said respective gaps between said plurality of scraper fingers define respective equiangularly spaced arc-shaped gaps within a cross section of said scraper finger cylinder.

17. A nozzle scraper body as claimed in claim 11 wherein respective scraping edges of said plurality of scraper fingers collectively define a major portion of a scraping edge circle and wherein a minor portion of said scraping edge circle comprises respective gaps between said respective scraping edges.

18. A nozzle scraper body as claimed in claim 17 wherein said respective gaps between respective scraping edges define respective equiangularly spaced arc-shaped gaps within said scraping edge circle.

19. A nozzle scraper body as claimed in claim 11 wherein said plurality of scraper fingers comprise a flexible and resilient material.

* * * * *